US011669077B2

(12) United States Patent
Domori et al.

(10) Patent No.: US 11,669,077 B2
(45) Date of Patent: Jun. 6, 2023

(54) MACHINE LEARNING APPARATUS, NUMERICAL CONTROL APPARATUS, WIRE ELECTRIC DISCHARGE MACHINE, AND MACHINE LEARNING METHOD

(71) Applicant: Mitsubishi Electric Corporation, Tokyo (JP)

(72) Inventors: Yuhei Domori, Tokyo (JP); Tatsuya Kato, Tokyo (JP); Ken Inukai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/613,086

(22) PCT Filed: Jul. 3, 2019

(86) PCT No.: PCT/JP2019/026543
§ 371 (c)(1),
(2) Date: Nov. 22, 2021

(87) PCT Pub. No.: WO2021/001974
PCT Pub. Date: Jan. 7, 2021

(65) Prior Publication Data
US 2022/0236722 A1 Jul. 28, 2022

(51) Int. Cl.
*G05B 19/418* (2006.01)
*B23H 11/00* (2006.01)
*B23H 7/20* (2006.01)

(52) U.S. Cl.
CPC ....... *G05B 19/41865* (2013.01); *B23H 11/00* (2013.01); *G05B 2219/31264* (2013.01);
(Continued)

(58) Field of Classification Search
CPC .......... G05B 2219/45043; B23H 11/00; B23H 7/20; B23H 7/04
See application file for complete search history.

(56) References Cited

U.S. PATENT DOCUMENTS 5,742,018 A * 4/1998 Akemura ................ B23H 7/20
219/69.18
2017/0060105 A1* 3/2017 Onodera .................. B23H 7/20
(Continued)

FOREIGN PATENT DOCUMENTS

EP 3372342 A1 * 9/2018 ............. B24B 49/04
EP 3382475 A2 * 10/2018 ............... B23H 1/00
(Continued)

OTHER PUBLICATIONS

International Search Report and Written Opinion dated Sep. 10, 2019, received for PCT Application PCT/JP2019/026543, Filed on Jul. 3, 2019, 8 pages including English Translation.
(Continued)

*Primary Examiner* — Geoffrey S Evans
(74) *Attorney, Agent, or Firm* — Xsensus LLP (57) ABSTRACT

A machine learning apparatus includes: a state observation unit that observes a characteristic shape, an adopted plan, and a determination result as state variables, the characteristic shape representing a shape of a part of a product of wire electric discharge machining, adjustment of machining conditions being deemed as necessary for the part of the product, the adopted plan being an adjustment method selected from among one or more adjustment methods for adjusting the machining conditions to improve machining performance for the part indicated by the characteristic shape, the determination result indicating whether implementation of the adopted plan is effective in improving machining performance for the part corresponding to the characteristic shape; and a learning unit that learns the machining condition adjustment method according to a data set created based on the state variables.

15 Claims, 7 Drawing Sheets

(52) U.S. Cl.
CPC .............. *G05B 2219/32348* (2013.01); *G05B 2219/45043* (2013.01)

(56) References Cited

U.S. PATENT DOCUMENTS

2018/0281091 A1  10/2018  Nakashima
2019/0329341 A1  10/2019  Shirai

FOREIGN PATENT DOCUMENTS

| EP | 3486845 A1 | * | 5/2019 | ............. B23H 7/065 |
| JP | 7-116927 A | | 5/1995 | |
| JP | 2017-42882 A | | 3/2017 | |
| JP | 2018-169934 A | | 11/2018 | |
| JP | 6526364 B1 | * | 6/2019 | ............... B23H 7/06 |
| JP | 6526364 B1 | | 6/2019 | |
| WO | WO-2019202672 A1 | * | 10/2019 | |

OTHER PUBLICATIONS

Decision to Grant dated Mar. 24, 2020, received for JP Application 2020-506366, 5 pages including English Translation.
Office Action dated Mar. 17, 2023 in German Patent Application No. 11 2019 007 437.7, 8 pages.

\* cited by examiner

MACHINE LEARNING APPARATUS, NUMERICAL CONTROL APPARATUS, WIRE ELECTRIC DISCHARGE MACHINE, AND MACHINE LEARNING METHOD

CROSS-REFERENCE TO RELATED APPLICATION

The present application is based on PCT filing PCT/JP2019/026543, filed Jul. 3, 2019, the entire contents of which are incorporated herein by reference.

FIELD

The present invention relates to a machine learning apparatus that learns a method for adjusting machining conditions for machining to be performed by a wire electric discharge machine, a numerical control apparatus, a wire electric discharge machine, and a machine learning method.

BACKGROUND

Patent Literature 1 discloses a control device that learns correction parameters for performing wire electric discharge machining by using machine learning. The control device described in Patent Literature 1 can obtain appropriate correction parameters for machining conditions on the basis of a machining shape, machining specifications, and the like by using a learning result.

CITATION LIST

Patent Literature

Patent Literature 1: Japanese Patent Application Laid-open No. 2018-169934

SUMMARY

Technical Problem

In the invention described in Patent Literature 1, it is determined whether desired machining accuracy has been achieved for the overall machining shape, and machine learning is performed by use of the determination result. Therefore, even when there is a problem with a part of the machining shape, machine learning is advanced for some of various correction parameters, including correction parameters that affect machining accuracy for the overall machining shape. Thus, the correction parameters are optimized. In this case, machining conditions are obtained on the basis of the correction parameters optimized so as to improve machining accuracy in terms of the overall machining shape. However, there is a possibility that optimum correction parameters are not used for machining conditions in terms of the part that actually has a problem.

The present invention has been made in view of the above, and an object of the present invention is to obtain a machine learning apparatus that implements a wire electric discharge machine capable of adjusting machining conditions for wire electric discharge machining so as to achieve appropriate machining conditions.

Solution to Problem

In order to solve the above-stated problems and achieve the object, a machine learning apparatus according to the present invention is to learn a machining condition adjustment method for wire electric discharge machining. The machine learning apparatus includes: a state observation unit to observe a characteristic shape, an adopted plan, and a determination result as state variables, the characteristic shape representing a shape of a part of a product of wire electric discharge machining, adjustment of machining conditions being deemed as necessary for the part of the product, the adopted plan being an adjustment method selected from among one or more adjustment methods for adjusting the machining conditions to improve machining performance for the part indicated by the characteristic shape, the determination result indicating whether implementation of the adopted plan is effective in improving machining performance for the part corresponding to the characteristic shape; and a learning unit to learn the machining condition adjustment method according to a data set created based on the state variables.

Advantageous Effects of Invention

A machine learning apparatus according to the present invention has an effect of implementing a wire electric discharge machine capable of adjusting machining conditions for wire electric discharge machining so as to achieve appropriate machining conditions.

DESCRIPTION OF EMBODIMENTS

Hereinafter, a machine learning apparatus, a numerical control apparatus, a wire electric discharge machine, and a machine learning method according to an embodiment of the present invention will be described in detail with reference to the drawings. Note that the present invention is not limited to the embodiment.

Embodiment

Figure 1:
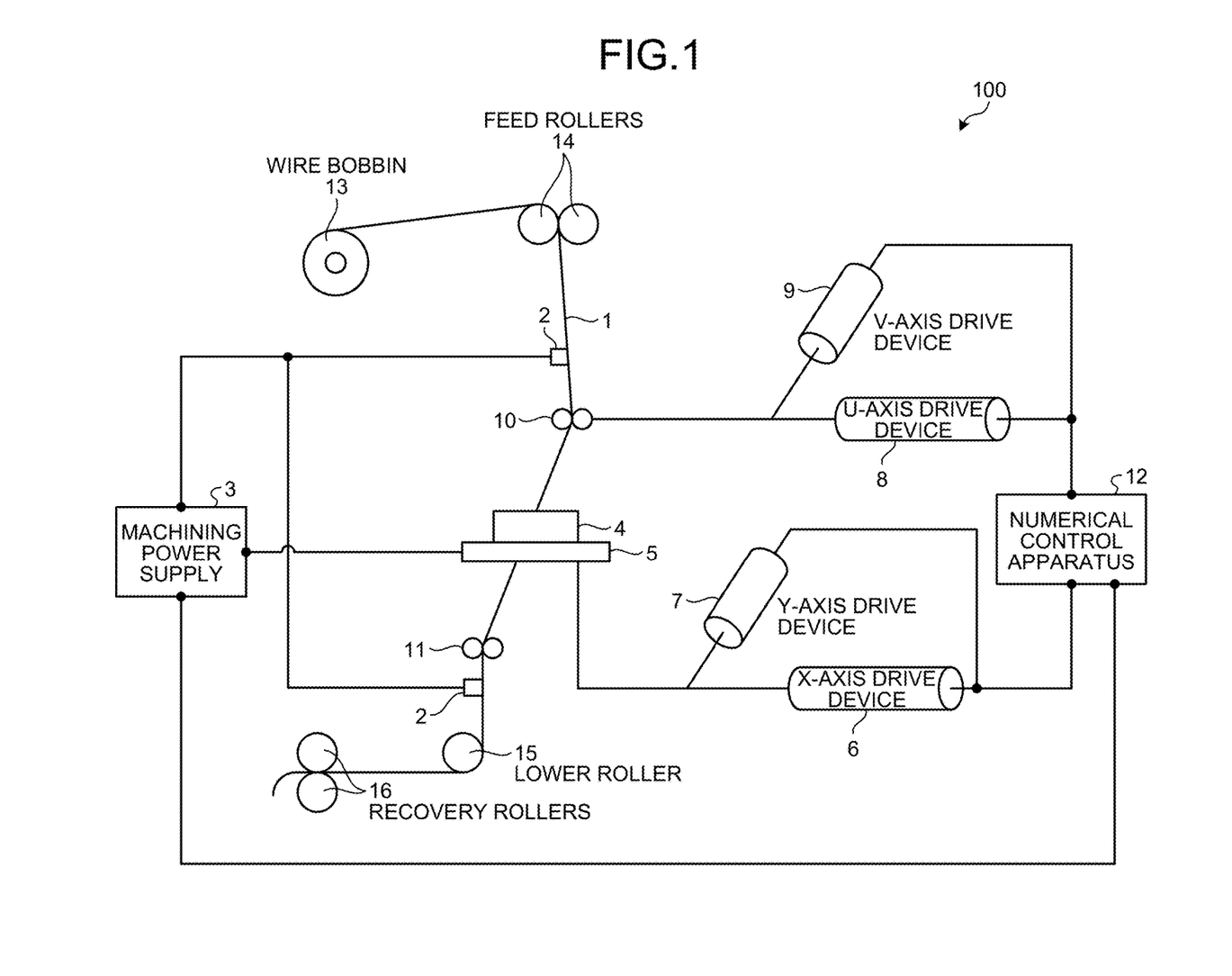
FIG. 1 is a diagram illustrating a configuration example of a wire electric discharge machine to be implemented by application of a machine learning apparatus according to an embodiment of the present invention.

FIG. 1 is a diagram illustrating a configuration example of a wire electric discharge machine to be implemented by application of a machine learning apparatus according to an embodiment of the present invention. A wire electric discharge machine 100 includes a wire electrode 1, a pair of power feeding elements 2, a machining power supply 3, and a table 5. The pair of power feeding elements 2 is in contact with the wire electrode 1. The machining power supply 3 applies a voltage to the power feeding elements 2. A workpiece 4 is to be mounted on the table 5. Furthermore, the wire electric discharge machine 100 includes an X-axis drive device 6, a Y-axis drive device 7, a U-axis drive device 8, a V-axis drive device 9, an upper die 10, and a lower die 11. The X-axis drive device 6 moves an X-axis. The Y-axis drive device 7 moves a Y-axis. The U-axis drive device 8 moves a U-axis. The V-axis drive device 9 moves a V-axis. The upper die 10 and the lower die 11 respectively serve as fulcrums of the upper and lower parts of the wire electrode 1 when the wire electrode 1 is inclined. In addition, the wire electric discharge machine 100 includes a numerical control apparatus 12 that controls the machining power supply 3, the X-axis drive device 6, the Y-axis drive device 7, the U-axis drive device 8, and the V-axis drive device 9. Although not illustrated in FIG. 1, the numerical control apparatus 12 includes the machine learning apparatus according to the present embodiment. Moreover, the wire electric discharge machine 100 includes a wire bobbin 13, feed rollers 14, a lower roller 15, and recovery rollers 16. The wire bobbin 13 supplies the wire electrode 1. The feed rollers 14 change the traveling direction of the wire electrode 1, and hold the wire electrode 1. The lower roller 15 changes the traveling direction of the wire electrode 1. The recovery rollers 16 recover the wire electrode 1 traveling in a direction changed by the lower roller 15.

The wire electric discharge machine 100 illustrated in FIG. 1 causes electric discharge between the wire electrode 1 and the workpiece 4 to machine the workpiece 4. That is, in the wire electric discharge machine 100, each of the X-axis drive device 6, the Y-axis drive device 7, the U-axis drive device 8, and the V-axis drive device 9 moves the corresponding axis to move, for example, the table 5, so that the workpiece 4 is machined in a desired shape. Note that the upper die 10 and the lower die 11 may be moved instead of the table 5. Alternatively, all the table 5, the upper die 10, and the lower die 11 may be moved.

As an example, a description will be given of a case where the X-axis drive device 6 and the Y-axis drive device 7 move the table 5, and the U-axis drive device 8 and the V-axis drive device 9 move the upper die 10.

In this case, when the X-axis drive device 6 and the Y-axis drive device 7 are driven to move the table 5, the upper die 10 and the lower die 11 move on an XY-plane with respect to the workpiece 4. Furthermore, when the U-axis drive device 8 and the V-axis drive device 9 are driven, the upper die 10 moves relative to the lower die 11. Thus, the numerical control apparatus 12 controls the X-axis drive device 6, the Y-axis drive device 7, the U-axis drive device 8, and the V-axis drive device 9. As a result, it is possible to implement taper machining in which the workpiece 4 is machined in a state where the wire electrode 1 is inclined and squeezed by the upper die 10 and the lower die 11.

Figure 2:
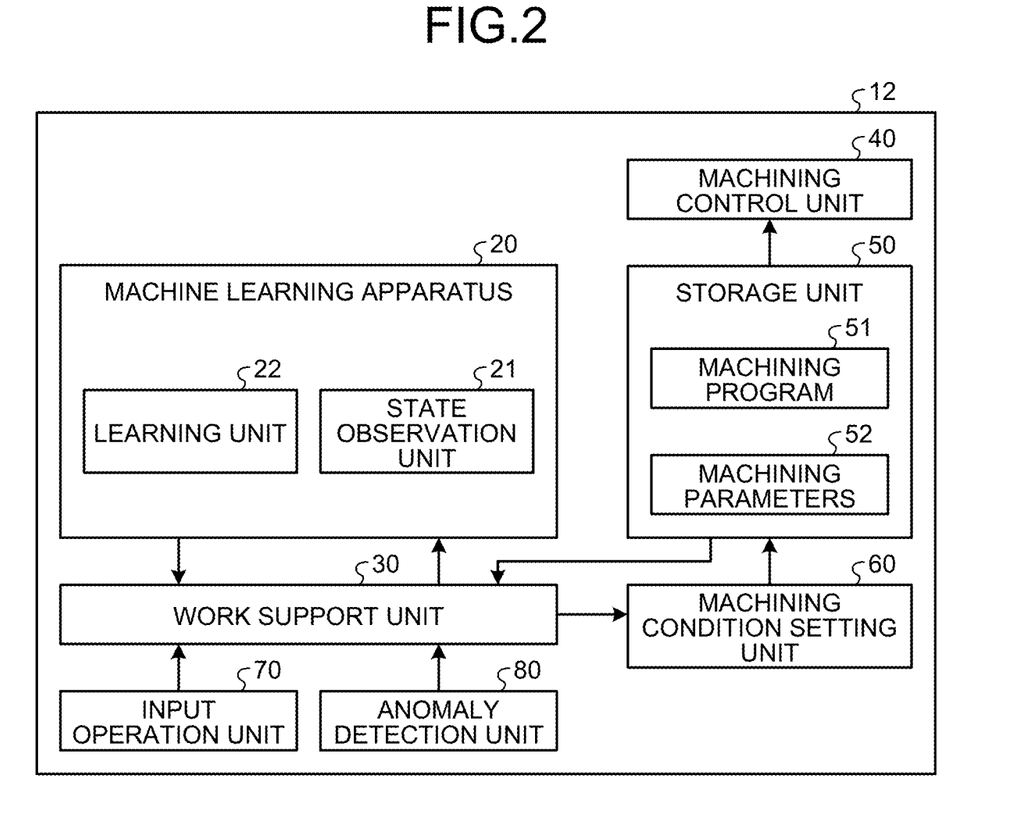
FIG. 2 is a diagram illustrating a configuration example of a numerical control apparatus according to the embodiment of the present invention.

Next, the numerical control apparatus 12 according to the present embodiment will be described. FIG. 2 is a diagram illustrating a configuration example of the numerical control apparatus 12 according to the embodiment of the present invention.

The numerical control apparatus 12 includes a machine learning apparatus 20 according to the present invention and a work support unit 30. The work support unit 30 supports an operator in performing work of setting machining conditions for wire electric discharge machining. Furthermore, the numerical control apparatus 12 includes a machining control unit 40, a storage unit 50, and a machining condition setting unit 60. The machining control unit 40 controls the machining power supply 3, the X-axis drive device 6, the Y-axis drive device 7, the U-axis drive device 8, and the V-axis drive device 9 illustrated in FIG. 1. The storage unit 50 stores various data including a machining program 51 and machining parameters 52. The machining condition setting unit 60 sets machining conditions for wire electric discharge machining. In addition, the numerical control apparatus 12 includes an input operation unit 70 and an anomaly detection unit 80. The input operation unit 70 is used by a user to perform an input operation. The anomaly detection unit 80 detects an anomaly in wire electric discharge machining. Note that in the following description, wire electric discharge machining may be simply referred to as "machining". In addition, machining conditions for wire electric discharge machining may be simply referred to as "machining conditions".

The machine learning apparatus 20 includes a state observation unit 21 and a learning unit 22. The state observation unit 21 observes, as state variables, an adjustment method adopted for adjusting machining conditions to improve machining performance, a result of determination as to whether the adopted adjustment method is effective, and the like. The learning unit 22 learns a machining condition adjustment method according to a data set created on the basis of the state variables observed by the state observation unit 21

The work support unit 30 presents, to the operator as a user, a proposed adjustment method for adjusting machining conditions, on the basis of a result of learning performed by the machine learning apparatus 20. In addition, the work support unit 30 collects and outputs a result of machining performed after adjustment of machining conditions, details of machining condition adjustment, and a characteristic shape, to the machine learning apparatus 20. The characteristic shape is information indicating the shape of a part of a product of machining in a case where, before machining condition adjustment, the user has determined that it is necessary to adjust machining conditions for the part of the product. Note that the information output from the work support unit 30 to the machine learning apparatus 20 is used for learning a machining condition adjustment method. The characteristic shape is a part of the overall shape of the product of machining, that is, a partial shape extracted from the overall shape. Furthermore, when receiving an operation for adjusting machining conditions from the operator via the input operation unit 70, the work support unit 30 instructs the machining condition setting unit 60 to adjust the machining conditions in accordance with details of the received operation. Details of the work support unit 30 will be described later.

The machining control unit 40 controls operation of the machining power supply 3, the X-axis drive device 6, the Y-axis drive device 7, the U-axis drive device 8, and the V-axis drive device 9 illustrated in FIG. 1 in accordance with the machining program 51 and the machining parameters 52 held in the storage unit 50, and performs wire electric discharge machining on the workpiece 4.

The storage unit 50 holds the machining program 51 and the machining parameters 52 created by means of an engineering tool (not illustrated) or the like. The machining parameters 52 include various kinds of parameters related to wire electric discharge machining, such as a machining speed, a machining voltage, a feed speed of the wire electrode 1, and a distance between the wire electrode 1 and the workpiece 4. The machining voltage refers to a voltage that the machining power supply 3 applies to the power feeding elements 2. The machining parameters 52, that is, the various parameters included in the machining parameters 52 are adjusted when the user performs an operation for adjusting machining conditions by using the input operation unit 70. The machining condition setting unit 60 adjusts the various parameters included in the machining parameters 52.

When receiving an instruction to adjust machining conditions from the work support unit 30, the machining condition setting unit 60 adjusts the machining conditions by changing the machining parameters 52 according to details of the instruction.

The input operation unit 70 receives, for example, an operation for adjusting machining conditions from the user.

The anomaly detection unit 80 detects a break in the wire electrode 1 (hereinafter, referred to as a "wire break") and a short circuit in which the wire electrode 1 and the workpiece 4 are in contact with each other (hereinafter, referred to as a "short circuit") during the machining of the workpiece 4 illustrated in FIG. 1. When detecting a wire break or a short circuit, the anomaly detection unit 80 holds information on a position where the wire break or the short circuit has occurred in association with information indicating the detected phenomenon (wire break or short circuit). The anomaly detection unit 80 detects a wire break and a short circuit by using a known method. The anomaly detection unit 80 detects a wire break by using, for example, a tension sensor that measures the tension of the wire electrode 1. Furthermore, the anomaly detection unit 80 detects a short circuit by using, for example, the value of a current discharged from the wire electrode 1.

Figure 3:
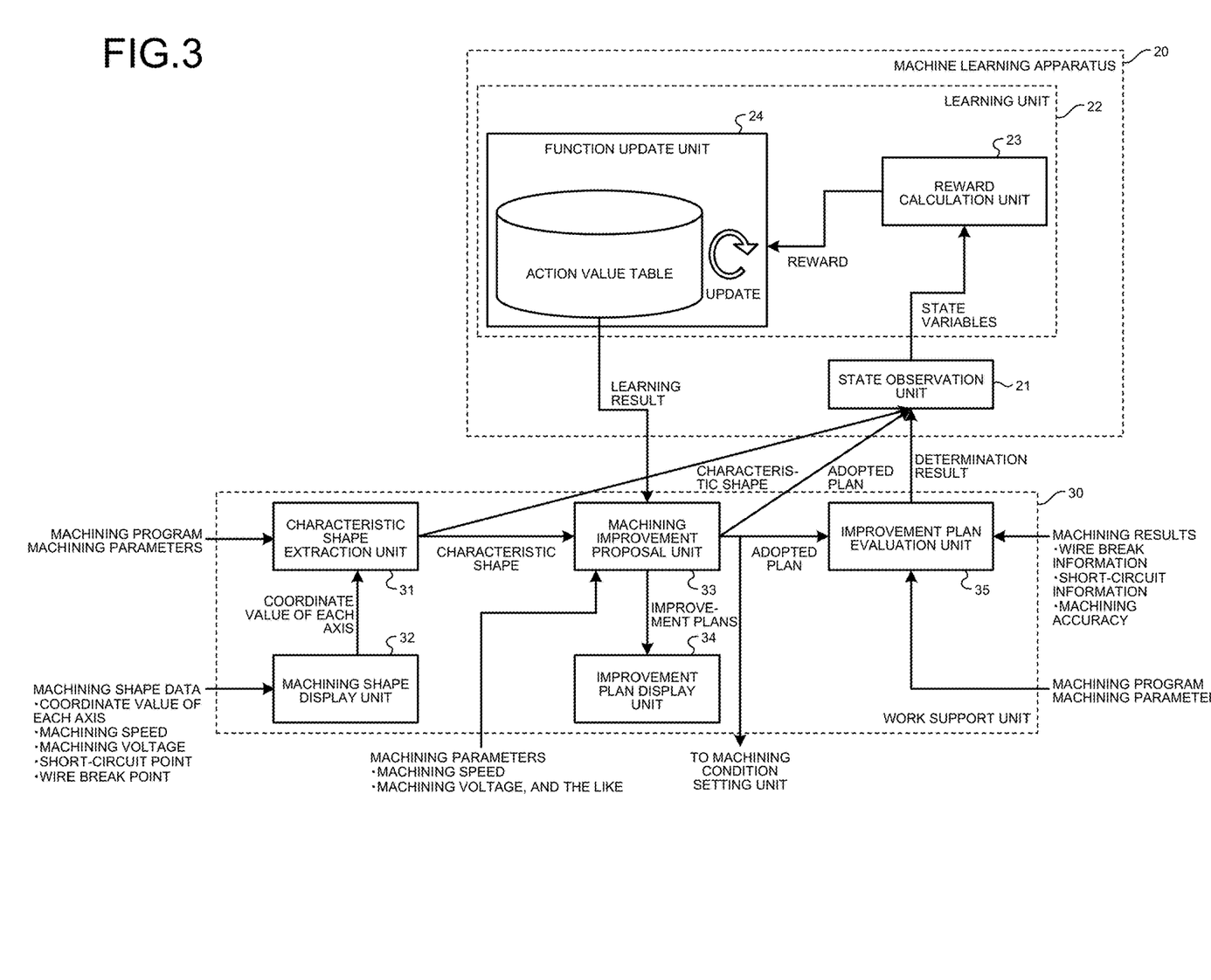
FIG. 3 is a diagram illustrating a configuration example of the machine learning apparatus and a work support unit included in the numerical control apparatus according to the embodiment of the present invention.

Next, a detailed description will be given of the machine learning apparatus 20 and the work support unit 30 included in the numerical control apparatus 12 according to the present embodiment.

FIG. 3 is a diagram illustrating a configuration example of the machine learning apparatus 20 and the work support unit 30 included in the numerical control apparatus 12 according to the embodiment of the present invention.

As illustrated in FIG. 3, the learning unit 22 of the machine learning apparatus 20 includes a reward calculation unit 23 and a function update unit 24. The reward calculation unit 23 calculates a reward on the basis of the state variables output from the state observation unit 21. The function update unit 24 updates an action value table on the basis of the reward calculated by the reward calculation unit 23. Details of each unit of the machine learning apparatus 20 will be described later.

The work support unit 30 includes a characteristic shape extraction unit 31, a machining shape display unit 32, a machining improvement proposal unit 33, an improvement plan display unit 34, and an improvement plan evaluation unit 35.

A coordinate value of each axis, a machining speed, a machining voltage, a short-circuit point, and a wire break point are input as machining shape data to the machining shape display unit 32. The coordinate value of each axis refers to the value of the coordinate of each of the X-axis, the Y-axis, the U-axis, and the V-axis during a period from the start of machining to the time point when a product of machining is obtained. The machining speed refers to the speed of the wire electrode 1 relative to the workpiece 4 being machined. The machining voltage refers to a voltage that the machining power supply 3 applies to the power feeding elements 2 during a machining process. The short-circuit point refers to a point indicating a location where a short circuit has occurred. The wire break point refers to a point indicating a location where a wire break has occurred.

The machining shape display unit 32 causes the display unit (not illustrated) to display a machining shape representing the shape of a product of machining (hereinafter, referred to as a machined product) based on each of the above-described information input as the machining shape data. At this time, in a case where a short circuit has occurred while the workpiece 4 is being machined, the machining shape display unit 32 causes the display unit to display a position where the short circuit has occurred in such a way as to superimpose the position on the machining shape. Similarly, in a case where a wire break has occurred while the workpiece 4 is being machined, the machining shape display unit 32 causes the display unit to display a position where the wire break has occurred in such a way as to superimpose the position on the machining shape. The display unit that displays the machining shape may be provided inside the numerical control apparatus 12, or may be provided outside the numerical control apparatus 12. The coordinate value of each axis, the machining speed, and the machining voltage are input from, for example, the machining control unit 40 to the machining shape display unit 32. The machining shape display unit 32 may analyze the machining program 51 and the machining parameters 52 to acquire the coordinate value of each axis, the machining speed, and the machining voltage. The short-circuit point and the wire break point are input from the anomaly detection unit 80 to the machining shape display unit 32.

Figure 4:
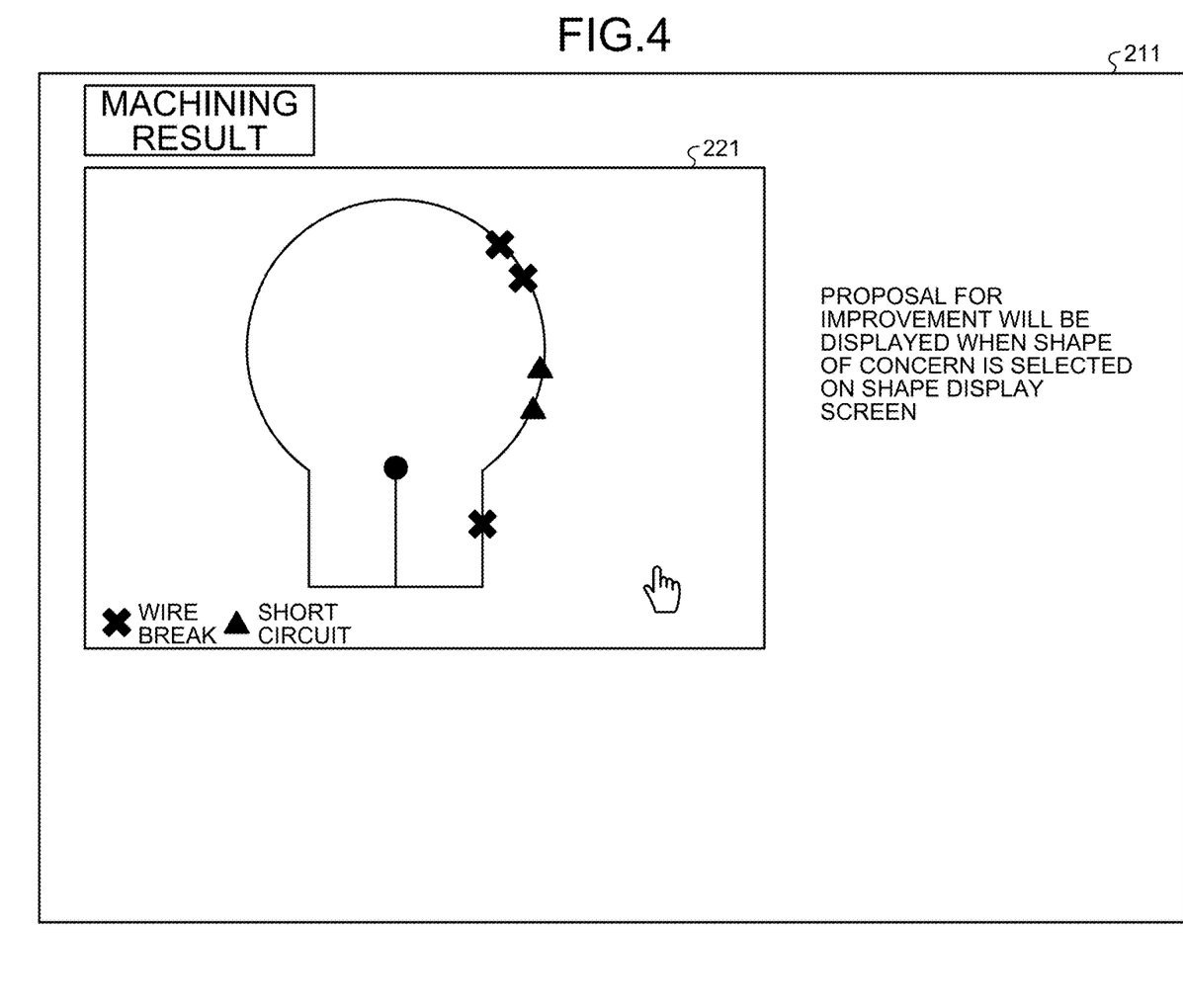
FIG. 4 is a diagram illustrating an example of a screen that a machining shape display unit causes a display unit to display.

FIG. 4 is a diagram illustrating an example of a screen that the machining shape display unit 32 causes the display unit to display. For example, when the input operation unit 70 illustrated in FIG. 2 receives a user operation for checking a machining result, the machining shape display unit 32 causes the display unit to display a screen 211 illustrated in FIG. 4. The screen 211 includes a machining shape display area 221 in which a machining shape that is a machining result is displayed. Short-circuit points and wire break points are also displayed in the machining shape display area 221 such that the short-circuit points and the wire break points are superimposed on the machining shape. Machining conditions under which the short-circuits and the wire breaks have occurred (the number of times of machining during which the short-circuits and the wire breaks have occurred) may be displayed on the basis of the machining parameters. Note that when the machining shape is displayed in the machining shape display area 221, the machining shape display unit 32 may cause the display unit to display information such as the machining voltage and the machining speed together with the short-circuit points and the wire break points.

Returning to description of FIG. 3, the coordinate value of each axis, the machining program 51, and the machining parameters 52 are input to the characteristic shape extraction unit 31. The coordinate value of each axis is input from the machining shape display unit 32 to the characteristic shape extraction unit 31. The characteristic shape extraction unit 31 reads the machining program 51 and the machining parameters 52 from the storage unit 50 when extracting a characteristic shape.

When the user selects any portion of the machining shape that the machining shape display unit 32 has caused the display unit to display, the characteristic shape extraction unit 31 extracts a characteristic shape that is information indicating the shape of the selected portion. Specifically, when any portion of the machining shape displayed by the machining shape display unit 32 is selected by the user, a coordinate value of each axis indicating the selected portion is output from the machining shape display unit 32 and input to the characteristic shape extraction unit 31. When the coordinate value of each axis is input, the characteristic shape extraction unit 31 reads the machining program 51 and the machining parameters 52 from the storage unit 50. The characteristic shape extraction unit 31 extracts, from the machining program 51 and the machining parameters 52, a characteristic shape of the portion selected by the user, and outputs the characteristic shape. The characteristic shape is indicated by the coordinate value of each axis input from the machining shape display unit 32. The characteristic shape indicates, for example, whether the shape of the selected portion corresponds to a straight, an arc, an edge, an approach, a continuous arc, a stepped shape, or a tapered shape. Note that the characteristic shape includes information indicating the portion selected by the user. The information indicating the portion selected by the user is, for example, the coordinate value of each axis. In addition, when the characteristic shape is an arc, the characteristic shape also includes, for example, information as to whether the arc corresponds to an inner corner or an outer corner and information on a diameter length of the arc. Furthermore, when the characteristic shape is an edge, the characteristic shape also includes, for example, information as to whether the edge corresponds to an inner corner or an outer corner and information on the angle of aperture. Moreover, when the characteristic shape is an approach, the characteristic shape also includes information indicating whether the approach corresponds to an inlet or an outlet. The characteristic shape extracted by the characteristic shape extraction unit 31 is input to the machining improvement proposal unit 33 and the state observation unit 21 of the machine learning apparatus 20.

The machining improvement proposal unit 33 receives input of the characteristic shape output by the characteristic shape extraction unit 31, a learning result that is the action value table held by the function update unit 24 of the machine learning apparatus 20, and machining parameters such as machining speed and machining voltage.

When the characteristic shape is input from the characteristic shape extraction unit 31, the machining improvement proposal unit 33 creates a machining condition improvement plan that is a proposed adjustment of machining parameters to be used for machining related to the input characteristic shape. The machining condition improvement plan includes a plurality of methods for adjusting machining parameters (hereinafter, referred to as parameter adjustment methods). Examples of the machining parameters include a wire diameter, a wire material, a workpiece material, and a plate thickness. The parameter adjustment method is an adjustment method for improving machining performance, and is prepared in advance by a manufacturer or the like of the wire electric discharge machine 100. The machining improvement proposal unit 33 creates a machining condition improvement plan by using the learning result input from the machine learning apparatus 20. The machining improvement proposal unit 33 creates one or more improvement plans for a single characteristic shape. In the operation of creating the improvement plan, the machining improvement proposal unit 33 determines priority order for displaying the parameter adjustment methods by using the learning result, and rearranges the parameter adjustment methods according to the priority order. The priority order of the parameter adjustment methods is determined on the basis of the reward calculated by the reward calculation unit 23 of the machine learning apparatus 20. Details will be described later. Specifically, the machining improvement proposal unit 33 gives a higher priority to a larger reward. It is assumed that a parameter adjustment method having a higher priority can be expected to achieve a larger improvement effect when implemented.

In addition, the machining improvement proposal unit 33 outputs an adopted plan that is information indicating a parameter adjustment method adopted by the user, the parameter adjustment method being among the plurality of parameter adjustment methods included in the improvement plan. The adopted plan output by the machining improvement proposal unit 33 is input to the state observation unit 21 of the machine learning apparatus 20, the improvement plan evaluation unit 35, and the machining condition setting unit 60. Note that when the adopted plan is input, the machining condition setting unit 60, which is not illustrated in FIG. 3, adjusts the machining parameters 52 held in the storage unit 50 according to the adopted plan.

The improvement plan display unit 34 causes the display unit (not illustrated) to display the improvement plan created by the machining improvement proposal unit 33. The user checks the displayed improvement plan, and performs an operation of selecting and adopting one or more parameter adjustment methods displayed as the improvement plan by using the input operation unit 70 illustrated in FIG. 2.

Figure 5:
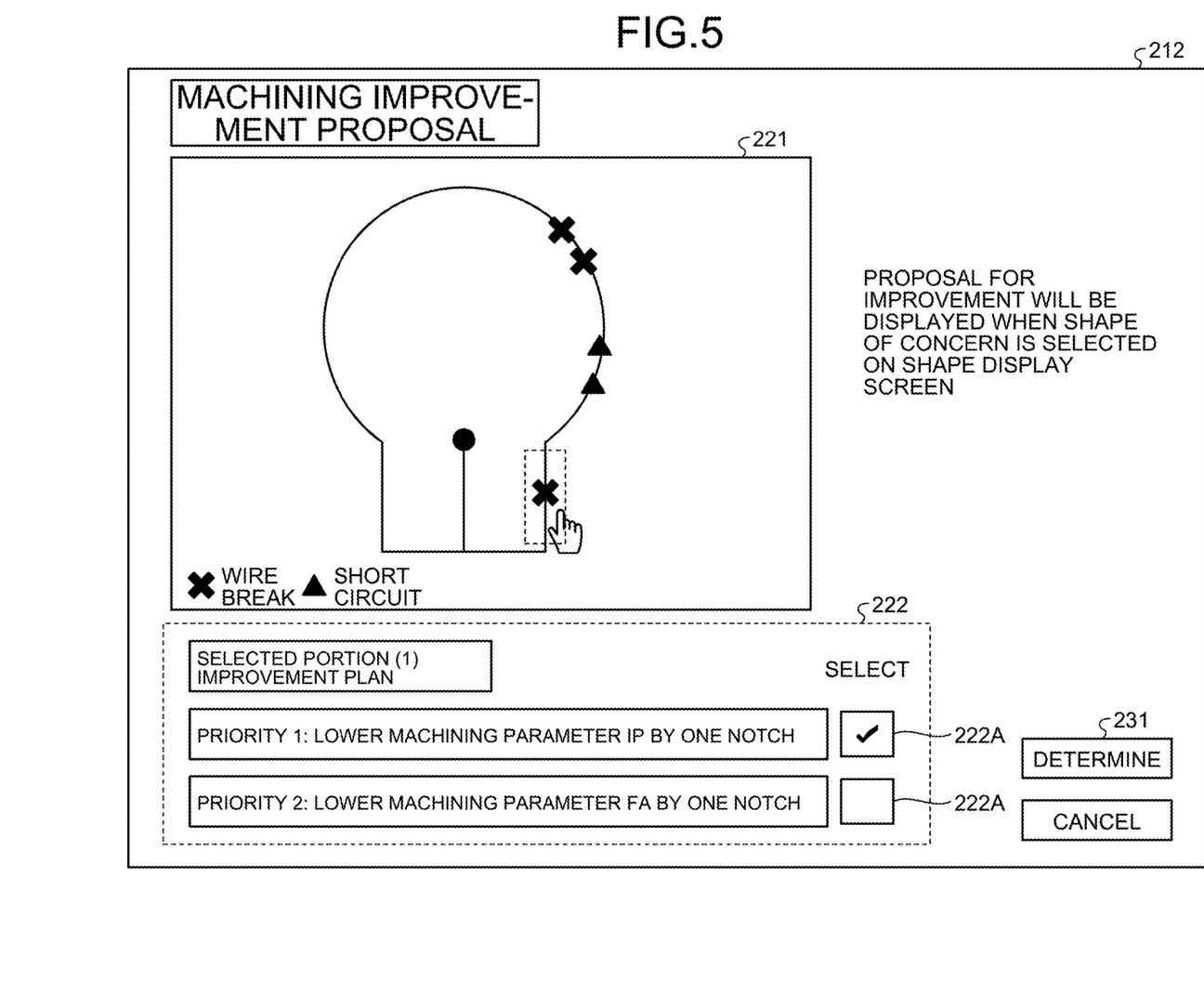
FIG. 5 is a diagram illustrating an example of a screen that an improvement plan display unit causes the display unit to display.

FIG. 5 is a diagram illustrating an example of a screen that the improvement plan display unit 34 causes the display unit to display. When an improvement plan is input from the machining improvement proposal unit 33, the improvement plan display unit 34 causes the display unit to display a screen 212 illustrated in FIG. 5. The screen 212 includes the machining shape display area 221 and an improvement plan display area 222. The machining shape display area 221 is the same as the machining shape display area 221 included in the screen 211 illustrated in FIG. 4. When any portion of the machining shape displayed in the machining shape display area 221 is selected by the user, an improvement plan is displayed in the improvement plan display area 222 accordingly. Although FIG. 5 illustrates an example in which two parameter adjustment methods are displayed as the improvement plan, three or more parameter adjustment methods may be displayed as the improvement plan. In addition, the improvement plan display unit 34 causes the display unit to display the parameter adjustment methods according to the priority order of the parameter adjustment methods, determined by the machining improvement proposal unit 33 on the basis of the learning result. In the example illustrated in FIG. 5, the highest priority is given to a parameter adjustment method in which a machining parameter IP is lowered by one notch, and the next highest priority is given to a parameter adjustment method in which a machining parameter FA is lowered by one notch.

The user selects one or more parameter adjustment methods to be performed from among the parameter adjustment methods displayed as the improvement plan on the display unit by, for example, referring to the priority order. Specifically, the user places a check mark in one or more selection fields 222A, and presses a determination button 231. When the input operation unit 70 receives the above operation, the machining improvement proposal unit 33 notifies the machining condition setting unit 60 of an adopted plan that is a parameter adjustment method selected by the user, and instructs the machining condition setting unit 60 to adjust the machining parameters 52 according to the adopted plan.

Returning to description of FIG. 3, the improvement plan evaluation unit 35 receives input of the adopted plan output by the machining improvement proposal unit 33, the machining program 51 and the machining parameters 52 held by the storage unit 50, and machining results including wire break information, short-circuit information, and machining accuracy. The wire break information is information indicating whether a wire break has occurred in the wire electrode 1. The short-circuit information is information indicating whether the wire electrode 1 and the workpiece 4 have been short-circuited. The wire break information and the short-circuit information are input from the anomaly detection unit 80. Note that the wire break information includes information on a location where a wire break has occurred. Furthermore, the short-circuit information includes information on a location where a short circuit has occurred. The machining accuracy is information indicating whether desired machining accuracy has been achieved. The machining accuracy is input by the user who has checked the machined product, by use of the input operation unit 70. That is, the machining accuracy is input from the input operation unit 70 to the improvement plan evaluation unit 35.

Figure 6:
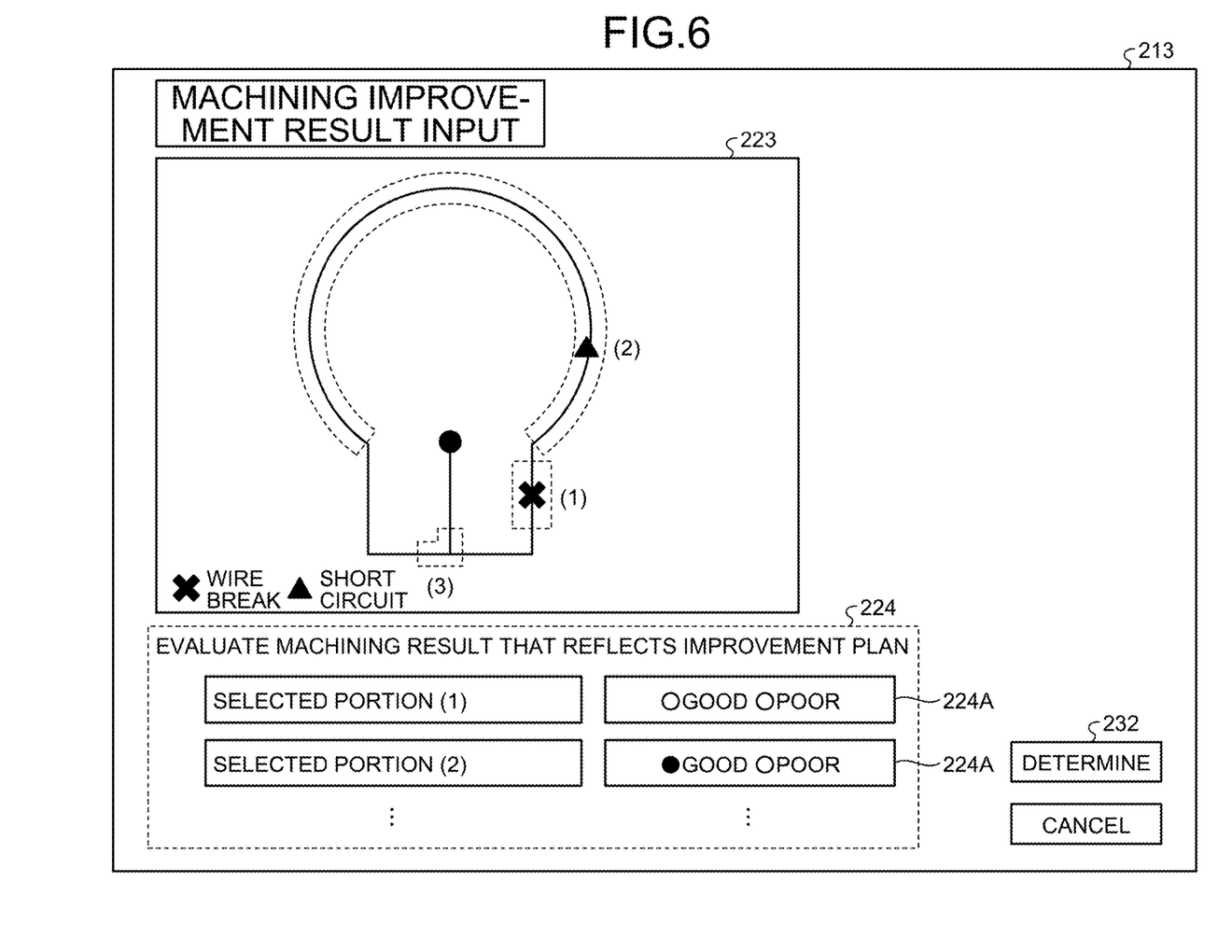
FIG. 6 is a diagram illustrating an example of a screen that an improvement plan evaluation unit causes the display unit to display.

When receiving input of the machining accuracy from the user, the improvement plan evaluation unit 35 causes the display unit (not illustrated) to display, for example, a screen 213 illustrated in FIG. 6. FIG. 6 is a diagram illustrating an example of a screen that the improvement plan evaluation unit 35 causes the display unit to display. The screen 213 includes a machining result 223 and an improvement plan determination result input area 224. The machining result 223 indicates a result of machining using the machining parameters 52 adjusted by the machining condition setting unit 60 according to the parameter adjustment method that the user has selected by checking the screen 212 illustrated in FIG. 5. Numerals (1) to (3) in the machining result 223 indicate characteristic shapes extracted by the characteristic shape extraction unit 31 when the user adjusted the machining parameters 52 the previous time, that is, characteristic shapes selected by the user.

The user checks the shape of each portion of (1) to (3) in the machining result 223, determines whether the machining result is good, and inputs a determination result in each of result input fields 224A of the improvement plan determination result input area 224. Specifically, the user determines whether each machining result is good or poor, and inputs each determination result. For example, the user measures the machined product by using a measuring instrument or the like, and determines that the machining result is good if the machining accuracy satisfies predetermined criteria. Here, examples of the machining accuracy include shape accuracy, pitch accuracy, surface roughness, straightness, and roundness. The user comprehensively determines whether the machining result is good on the basis of these types of machining accuracy. After inputting determination results for all the characteristic shapes (three shapes of (1) to (3) in the example of FIG. 6), the user presses a determination button 232 to input machining accuracy to the improvement plan evaluation unit 35. Note that the improvement plan evaluation unit 35 may determine whether the machining result is good on the basis of the wire break information and the short-circuit information for a location where a wire break occurred and a location where a short circuit occurred in the previous machining result. That is, the improvement plan evaluation unit 35 checks the wire break information and the short-circuit information for each of the characteristic shapes. As a result, the improvement plan evaluation unit 35 determines that the machining result is good when neither a wire break nor a short circuit has occurred, and determines that the machining result is poor when at least either a wire break or a short circuit has occurred. The previous machining result refers to a machining result of machining performed before adjustment of the machining parameters 52.

The improvement plan evaluation unit 35 evaluates whether the parameter adjustment method corresponding to the adopted plan output by the machining improvement proposal unit 33 is effective, on the basis of each input information. Specifically, the improvement plan evaluation unit 35 determines whether it is effective to adjust the machining parameters 52 according to the adopted plan output by the machining improvement proposal unit 33, that is, whether machining performance has been improved by the machining parameters 52 adjusted according to the adopted plan. When the machining result is input, the improvement plan evaluation unit 35 compares the machining result with the previous machining result. The improvement plan evaluation unit 35 determines that the parameter adjustment method is effective for a characteristic shape in a case where the previous machining result for the characteristic shape is poor and the current machining result for the characteristic shape is good. Otherwise, the improvement plan evaluation unit 35 determines that the parameter adjustment method is not effective. The current machining result refers to a machining result of machining performed after adjustment of the machining parameters 52. The improvement plan evaluation unit 35 outputs the determination result for each characteristic shape to the state observation unit 21 of the machine learning apparatus 20.

Next, a description will be given of operation in which the numerical control apparatus 12 presents, to a user, an improvement plan for improving machining performance by adjusting machining conditions for wire electric discharge machining and operation of learning the improvement plan. These two types of operation are performed as a series of operation steps.

Figure 7:
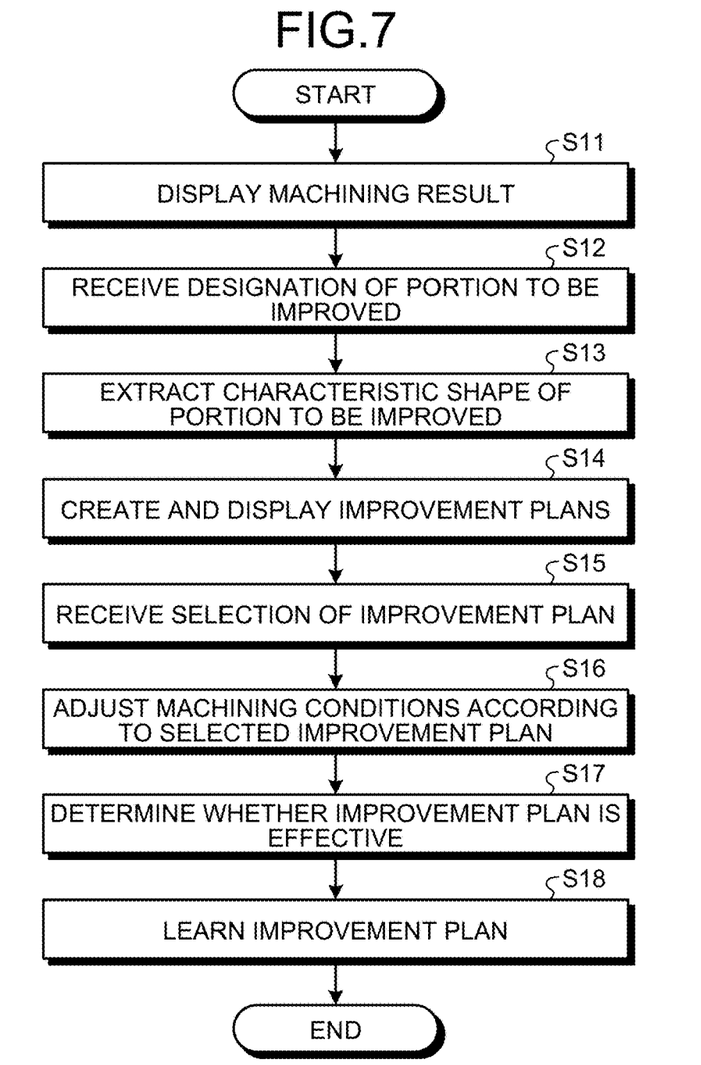
FIG. 7 is a flowchart illustrating an example of operation of the numerical control apparatus according to the embodiment of the present invention.

FIG. 7 is a flowchart illustrating an example of the operation of the numerical control apparatus 12 according to the present embodiment. Specifically, the flowchart of FIG. 7 illustrates operation in which the numerical control apparatus 12 presents improvement plans to a user who adjusts machining conditions for wire electric discharge machining, adjusts the machining conditions according to an adopted plan that is a parameter adjustment method selected by the user from among parameter adjustment methods presented as the improvement plans, and learns the improvement plan by using a result of machining performed under the adjusted machining conditions. This operation is performed by the machine learning apparatus 20 and the work support unit 30 illustrated in FIG. 3. Furthermore, this operation is performed after completion of machining of the workpiece 4 performed by the wire electric discharge machine 100.

In the operation illustrated in FIG. 7, the numerical control apparatus 12 first displays a machining result (step S11). Specifically, the machining shape display unit 32 causes the display unit to display the screen 211 illustrated in FIG. 4.

Next, the numerical control apparatus 12 receives, from the user, designation of a portion to be improved (step S12). Specifically, the machining shape display unit 32 receives designation of a portion of a machining shape for which machining performance needs to be improved, the machining shape being displayed in the machining shape display area 221 included in the screen 211 illustrated in FIG. 4.

Next, the numerical control apparatus 12 extracts a characteristic shape of the designated portion to be improved (step S13). Specifically, the machining shape display unit 32 outputs, to the characteristic shape extraction unit 31, the coordinate value of each axis corresponding to the designated portion to be improved. Then, the characteristic shape extraction unit 31 extracts, from the machining program 51 and the machining parameters 52, the characteristic shape of the portion indicated by the received coordinate value of each axis.

Next, the numerical control apparatus 12 creates and displays improvement plans for improving machining performance for the portion to be improved that has been designated in step S12 (step S14). Specifically, the machine learning apparatus 20 appropriately updates the action value table by using the past results of machining parameter adjustment and past machining results. The machining improvement proposal unit 33 adjusts machining parameters by using the action value table thus updated, and creates improvement plans for improving machining performance. In addition, the improvement plan display unit 34 causes the display unit to display the improvement plans created by the machining improvement proposal unit 33. The machining improvement proposal unit 33 causes the display unit to display the screen 212 illustrated in FIG. 5.

Next, the numerical control apparatus 12 receives, from the user, selection of an improvement plan (step S15). Specifically, the machining improvement proposal unit 33 receives, from the user, an operation for selecting a parameter adjustment method to be performed from among parameter adjustment methods displayed as the improvement plans in the improvement plan display area 222 included in the screen 212 illustrated in FIG. 5. Note that a plurality of parameter adjustment methods may be selected in some cases. That is, the user can select one or more parameter adjustment methods to be performed.

Next, the numerical control apparatus 12 adjusts machining conditions according to the selected improvement plan (parameter adjustment method) (step S16). Specifically, the machining improvement proposal unit 33 notifies the machining condition setting unit 60 of the parameter adjustment method selected by the user, and instructs the machining condition setting unit 60 to perform adjustment according to the parameter adjustment method. Upon receiving this instruction, the machining condition setting unit 60 adjusts some of the various parameters included in the machining parameters 52 in accordance with the parameter adjustment method of which the machining condition setting unit 60 has been notified. The some of the various parameters correspond to the parameter adjustment method. After adjustment of the parameters, the numerical control apparatus 12 controls operation of the machining power supply 3, the X-axis drive device 6, the Y-axis drive device 7, the U-axis drive device 8, and the V-axis drive device 9 illustrated in FIG. 1 by using the adjusted parameters, so that the workpiece 4 is machined. When receiving a machining start operation from the user, the numerical control apparatus 12 starts machining of the workpiece 4. The numerical control apparatus 12 may automatically start machining of the workpiece 4 after adjustment of the parameters.

Next, the numerical control apparatus 12 determines whether the improvement plan is effective (step S17). Specifically, the improvement plan evaluation unit 35 compares the previous machining result with the current machining result, and determines whether the machining parameter adjustment performed by the machining condition setting unit 60 according to the parameter adjustment method is effective. When machining performance has been improved as a result of the machining parameter adjustment performed by the machining condition setting unit 60 according to the parameter adjustment method, the improvement plan evaluation unit 35 determines that the improvement plan is effective for the portion to be improved.

Next, the numerical control apparatus 12 learns the improvement plan (step S18). Specifically, the machine learning apparatus 20 learns an adopted plan, that is, a parameter adjustment method selected by the user, by using a characteristic shape, the adopted plan, and a determination result input from the work support unit 30. The learning result is used when the machining improvement proposal unit 33 creates an improvement plan next time. Details of the machine learning apparatus 20 will be described below.

In the machine learning apparatus 20, the state observation unit 21 observes, as state variables, the characteristic shape, the adopted plan, and the determination result output from the work support unit 30. The state observation unit 21 outputs the observed state variables to the learning unit 22. The learning unit 22 learns an improvement plan according to a data set created on the basis of the state variables input from the state observation unit 21.

The learning unit 22 may use any learning algorithm for learning an improvement plan. As an example, a case where reinforcement learning is applied will be described. In reinforcement learning, an action subject that is an agent in a certain environment observes a current state, and determines an action to be taken. The agent obtains a reward from the environment by selecting an action, and learns a measure that maximizes the reward through a series of actions. Q-learning or TD-learning is known as a representative method for reinforcement learning. For example, in the case of Q-learning, a general update formula of an action value function Q(s,a) is expressed by formula (1) below. The action value function Q(s,a) is also called an action value table.

[Formula 1]

$$Q(s_t, a_t) \leftarrow Q(s_t, a_t) + \alpha\left(r_{t+1} + \gamma\max_a Q(s_{t+1}, a) - Q(s_t, a_t)\right) \quad (1)$$

In formula (1), the symbol "$s_t$" represents an environment at time t, and the symbol "$a_t$" represents an action at time t. As a result of the action $a_t$, the environment changes to $s_{t+1}$. The symbol "$r_{t+1}$" represents a reward given according to a change in the environment, the symbol "γ" represents a discount rate, and the symbol "α" represents a learning coefficient. Note that γ is in a range of 0<γ≤1, and α is in a range of 0<α≤1. When Q-learning is applied, the action $a_t$ corresponds to machining parameter adjustment to be performed in the numerical control apparatus 12 according to the adopted plan, that is, machining parameter adjustment to be performed according to the parameter adjustment method selected by the user.

The update formula represented by formula (1) increases an action value Q when the action value Q of the best action "a" at time t+1 is larger than the action value Q of the action "a" taken at time t, and decreases the action value Q in the opposite case. In other words, the action value function Q(s,a) is updated such that the action value Q of the action "a" at time t approaches the best action value at time t+1. As a result, the best action value in a certain environment is sequentially propagated to action values in the previous environments.

The reward calculation unit 23 of the learning unit 22 calculates a reward "r" on the basis of the characteristic shape, the adopted plan, and the determination result as state variables. For example, in a case where the determination result indicates that machining performance has been improved, the reward calculation unit 23 increases the reward "r". The reward calculation unit 23 increases the reward "r" by adding, for example, "1". Meanwhile, in a case where the determination result does not indicate that machining performance has been improved, the reward calculation unit 23 reduces the reward "r". The reward calculation unit 23 reduces the reward "r" by adding, for example, "−1". Note that the case where the determination result does not indicate that machining performance has been improved includes a case where machining performance does not change and a case where machining performance deteriorates. Therefore, the reward calculation unit 23 may maintain the previous value of the reward "r" without changing the reward "r" when machining performance does not change, and may reduce the reward "r" when machining performance deteriorates. In addition, the reward calculation unit 23 may reduce the reward "r" by using different reduction amounts for a case where machining performance does not change and a case where machining performance deteriorates.

The function update unit 24 of the learning unit 22 updates a function to be used by the machining improvement proposal unit 33 of the work support unit 30 to create an improvement plan according to the reward "r" calculated by the reward calculation unit 23. For example, in the case of Q-learning, an action value function $Q(s_t, a_t)$ represented by formula (1) is used as a function for creating an improvement plan.

As described above, the characteristic shape, the adopted plan, and the determination result are pieces of information to be observed as state variables by the state observation unit 21. Therefore, the learning unit 22 learns an improvement plan, more specifically, learns a parameter adjustment method selected as an adopted plan by the user, for each characteristic shape.

In the process in which the machining improvement proposal unit 33 of the work support unit 30 creates an improvement plan by using the action value function $Q(s_t, a_t)$ that is an action value table, higher priority is given to a parameter adjustment method included in the improvement plan when the parameter adjustment method achieves a higher action value Q. Therefore, it can be said that the action value function $Q(s_t, a_t)$, which is a function to be used by the machining improvement proposal unit 33 to create an improvement plan, is a function for determining the priority order of the parameter adjustment methods.

As described above, the numerical control apparatus 12 according to the present embodiment includes the machine learning apparatus 20 and the work support unit 30. The work support unit 30 generates a characteristic shape, a machining condition adjustment method selected by the user, and information indicating whether the machining condition adjustment method selected by the user is effective. The characteristic shape represents the shape of a portion of a machined product that is a product of wire electric discharge machining, the portion being selected by the user. Then, the work support unit 30 outputs these pieces of information to the machine learning apparatus 20. The machine learning apparatus 20 observes, as state variables, the information output from the work support unit 30, and learns the machining condition adjustment method selected by the user. In a case where the user intends to improve machining performance by adjusting machining conditions for wire electric discharge machining, the work support unit 30 creates a machining condition improvement plan by using the result of learning performed by the machine learning apparatus 20, and presents the created improvement plan to the user. Since the machine learning apparatus 20 learns the machining condition adjustment method for improving machining performance for the characteristic shape indicating the shape of the portion selected by the user, the work support unit 30 can create an improvement plan individually for a portion requiring improvement of machining performance. Application of the numerical control apparatus 12 implements a wire electric discharge machine capable of adjusting machining conditions for wire electric discharge machining so as to achieve appropriate machining conditions.

Figure 8:
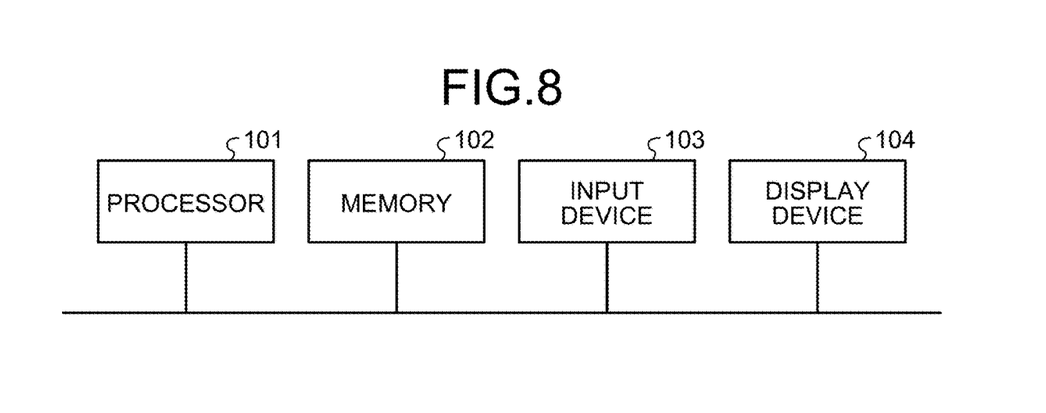
FIG. 8 is a diagram illustrating an example of hardware that implements the numerical control apparatus according to the embodiment of the present invention.

Next, the hardware configuration of the numerical control apparatus 12 will be described. FIG. 8 is a diagram illustrating an example of hardware that implements the numerical control apparatus 12 according to the present embodiment. The numerical control apparatus 12 is implemented by a processor 101, a memory 102, an input device 103, and a display device 104.

The processor 101 is a central processing unit (CPU), a processing device, an arithmetic device, a microprocessor, a microcomputer, a processor, or a digital signal processor (DSP) or the like. The memory 102 corresponds to a nonvolatile or volatile semiconductor memory, such as a random access memory (RAM), a read only memory (ROM), or a flash memory, a magnetic disk, or the like. The memory 102 holds a program for causing the processor 101 to operate as the numerical control apparatus 12, and various other data. The memory 102 is also used as a work memory when the processor 101 executes various types of processing. Furthermore, the memory 102 is included in the storage unit 50 illustrated in FIG. 2.

The input device 103 is a mouse, a keyboard, a touch panel, or the like, and is included in the input operation unit 70 illustrated in FIG. 2. The display device 104 is a liquid crystal monitor, a display, or the like, and is included in the display unit that displays the screens 211 to 213 and the like illustrated in FIGS. 4 to 6.

The machine learning apparatus 20 and the work support unit 30 included in the numerical control apparatus 12 are implemented by the processor 101 and the memory 102. Specifically, a program for causing each unit of the machine learning apparatus 20 to operate and a program for causing each unit of the work support unit 30 to operate are stored in the memory 102, and the processor 101 reads and executes the programs stored in the memory 102. As a result, each unit of the machine learning apparatus 20 and each unit of the work support unit 30 are implemented.

The configurations set forth in the above embodiment show examples of the subject matter of the present invention, and it is possible to combine the configurations with another technique that is publicly known, and is also possible to make omissions and changes to part of the configurations without departing from the gist of the present invention.

REFERENCE SIGNS LIST 1 wire electrode; 2 power feeding element; 3 machining power supply; 4 workpiece; 5 table; 6 X-axis drive device; 7 Y-axis drive device; 8 U-axis drive device; 9 V-axis drive device; 10 upper die; 11 lower die; 12 numerical control apparatus; 13 wire bobbin; 14 feed roller; 15 lower roller; 16 recovery roller; 20 machine learning apparatus; 21 state observation unit; 22 learning unit; 23 reward calculation unit; 24 function update unit; 30 work support unit; 31 characteristic shape extraction unit; 32 machining shape display unit; 33 machining improvement proposal unit; 34 improvement plan display unit; 35 improvement plan evaluation unit; 40 machining control unit; 50 storage unit; 51 machining program; 52 machining parameter; 60 machining condition setting unit; 70 input operation unit; 80 anomaly detection unit; 100 wire electric discharge machine.

The invention claimed is:

1. A numerical control apparatus comprising:
a machine learning apparatus that learns a machining condition adjustment method for wire electric discharge machining, the apparatus including:
 a state observation circuitry to observe a characteristic shape, an adopted plan, and a determination result as state variables, the characteristic shape representing a shape of a part of a product of the wire electric discharge machining, adjustment of machining conditions being deemed as necessary for the part of the product, the adopted plan being an adjustment method selected from among one or more adjustment methods for adjusting the machining conditions to improve machining performance for the part indicated by the characteristic shape, the determination result indicating whether the implementation of the adopted plan is effective in improving machining performance for the part corresponding to the characteristic shape; and
 a learning circuitry to learn the machining condition adjustment method according to a data set created based on the state variables,
characteristic shape extraction circuitry to extract the characteristic shape from a shape of the product;
machining improvement proposal circuitry to create, as an improvement plan, adjustment methods for adjusting machining conditions to improve machining performance for the part indicated by the characteristic shape based on the characteristic shape extracted by the characteristic shape extraction circuitry and a result of learning performed by the learning circuitry, and output, as the adopted plan, any of the created adjustment methods to the machine learning apparatus, the any of the created adjustment methods being selected by a user; and
improvement plan evaluation circuitry to generate the determination result based on a result of the wire electric discharge machining performed in accordance with the adopted plan applied to the wire electric discharge machining, and output the determination result to the machine learning apparatus.

2. The numerical control apparatus according to claim 1, wherein the learning circuitry includes:
a reward calculation circuitry to calculate a reward based on the data set; and
a function update circuitry to update, based on the reward, a function for determining priority order of adjustment methods to be offered to the user, the user performing machining condition adjustment work for improving machining performance for the part indicated by the characteristic shape.

3. The numerical control apparatus according to claim 2, wherein:
the reward calculation circuitry increases the reward when implementation of the adopted plan is effective in improving machining performance for the part corresponding to the characteristic shape, and reduces the reward when the implementation of the adopted plan is not effective in improving machining performance for the part corresponding to the characteristic shape.

4. The numerical control apparatus according to claim 2, wherein:
the reward calculation circuitry increases the reward when the implementation of the adopted plan has improved machining performance for the part corresponding to the characteristic shape, reduces the reward when the implementation of the adopted plan has deteriorated machining performance for the part corresponding to the characteristic shape, and does not change the reward when the implementation of the adopted plan has caused no change in machining performance for the part corresponding to the characteristic shape.

5. The numerical control apparatus according to claim 1, wherein:
the machining improvement proposal circuitry creates the improvement plan by rearranging a plurality of machining condition adjustment methods in descending order of machining performance improvement effect, based on the result of learning.

6. The numerical control apparatus according to claim 1, wherein:
the improvement plan evaluation circuitry generates the determination result based on wire break information, short-circuit information, and machining accuracy, the wire break information indicating whether a wire break in a wire electrode has occurred in the wire electric discharge machining, the short-circuit information indicating whether the wire electrode and a workpiece have been short-circuited in the wire electric discharge machining, the machining accuracy indicating whether desired machining accuracy has been achieved in the wire electric discharge machining.

7. The numerical control apparatus according to claim 1, further comprising:
improvement plan display circuitry to cause a display to display the improvement plan created by the machining improvement proposal circuitry.

8. A wire electric discharge machine comprising the numerical control apparatus according to claim 1.

9. A machine learning method comprising:
observing a characteristic shape, an adopted plan, and a determination result as state variables, the characteristic shape representing a shape of a part of a product of wire electric discharge machining, adjustment of machining conditions being deemed as necessary for the part of the product, the adopted plan being an adjustment method selected from among one or more adjustment methods for adjusting the machining conditions to improve machining performance for the part indicated by the characteristic shape, the determination result indicating whether implementation of the adopted plan is effective in improving machining performance for the part corresponding to the characteristic shape;
learning the machining condition adjustment method according to a data set created based on the state variables;
extracting the characteristic shape from a shape of the product creating, as an improvement plan, adjustment methods for adjusting the machining conditions to improve machining performance for the part indicated by the characteristic shape based on the characteristic shape extracted by the characteristic shape extraction circuitry and a result of learning, and outputting, as the adopted plan, any of the created adjustment methods to the machine learning apparatus, the any of the created adjustment methods being selected by a user; and generating the determination result based on a result of the wire electric discharge machining performed in accordance with the adopted plan applied to the wire electric discharge machining, and outputting the determination result.

10. The method according to claim 9, wherein:
the creating creates the improvement plan by rearranging a plurality of machining condition adjustment methods in descending order of machining performance improvement effect, based on the result of learning.

11. The method according to claim 9, wherein:
the generating generates the determination result based on wire break information, short-circuit information, and machining accuracy, the wire break information indicating whether a wire break in a wire electrode has occurred in the wire electric discharge machining, the short-circuit information indicating whether the wire electrode and a workpiece have been short-circuited in the wire electric discharge machining, the machining accuracy indicating whether desired machining accuracy has been achieved in the wire electric discharge machining.

12. The method according to claim 9, further comprising:
causing a display to display the improvement plan.

13. The method according to claim 9, wherein the learning comprises:
calculating a reward based on the data set; and
updating, based on the reward, a function for determining priority order of adjustment methods to be offered to the user, the user performing machining condition adjustment work for improving machining performance for the part indicated by the characteristic shape.

14. The method according to claim 13, wherein:
the calculating the reward increases the reward when the implementation of the adopted plan is effective in improving machining performance for the part corresponding to the characteristic shape, and reduces the reward when the implementation of the adopted plan is not effective in improving machining performance for the part corresponding to the characteristic shape.

15. The method according to claim 13, wherein:
the calculating the reward increases the reward when the implementation of the adopted plan has improved machining performance for the part corresponding to the characteristic shape, reduces the reward when the implementation of the adopted plan has deteriorated machining performance for the part corresponding to the characteristic shape, and does not change the reward when the implementation of the adopted plan has caused no change in machining performance for the part corresponding to the characteristic shape.

* * * * *